(12) United States Patent
Merriman et al.

(10) Patent No.: US 8,298,375 B2
(45) Date of Patent: Oct. 30, 2012

(54) FRICTION PAPERS COMPRISING PIPD FIBER

(75) Inventors: Edmund A. Merriman, Midlothian, VA (US); Achim Amma, Richmond, VA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 746 days.

(21) Appl. No.: 12/084,025

(22) PCT Filed: Dec. 19, 2006

(86) PCT No.: PCT/US2006/062271
§ 371 (c)(1),
(2), (4) Date: Apr. 23, 2008

(87) PCT Pub. No.: WO2007/076335
PCT Pub. Date: Jul. 5, 2007

(65) Prior Publication Data
US 2009/0151884 A1 Jun. 18, 2009

Related U.S. Application Data

(60) Provisional application No. 60/752,854, filed on Dec. 21, 2005.

(51) Int. Cl.
D21H 13/20 (2006.01)
D21H 13/26 (2006.01)
D21H 13/40 (2006.01)
D21H 13/48 (2006.01)

(52) U.S. Cl. ............... 162/157.2; 162/164.1; 162/164.6; 528/186; 528/342; 528/423

(58) Field of Classification Search .................. 528/183, 528/186, 193, 342, 423; 162/157.2, 164.1, 162/164.6
See application file for complete search history.

(56) References Cited

U.S. PATENT DOCUMENTS

| | | | | |
|---|---|---|---|---|
| 5,083,650 A | * | 1/1992 | Seiz et al. ................ | 192/107 M |
| 5,674,969 A | * | 10/1997 | Sikkema et al. ............. | 528/183 |
| 5,856,244 A | * | 1/1999 | Lam et al. ...................... | 442/73 |
| 5,989,390 A | * | 11/1999 | Lee ................ | 162/141 |
| 6,013,696 A | * | 1/2000 | Hill et al. ...................... | 523/149 |
| 6,667,104 B2 | * | 12/2003 | Aiba et al. .................... | 428/447 |
| 2004/0198866 A1 | * | 10/2004 | Sasaki .......................... | 523/152 |

FOREIGN PATENT DOCUMENTS

| | | | | |
|---|---|---|---|---|
| FR | 1552307 A | * | 1/1969 | |
| WO | WO 98/30752 A | * | 7/1998 | |
| WO | WO 99/27169 A1 | * | 6/1999 | |

OTHER PUBLICATIONS

Sikkema, D. "Advances in M5 (PIPD) fiber properties and expectations from fiber theories", Abstracts from Polymer Fibres Conference, Manchester, Jul. 10-12, 2002, pp. 1-13 [online] [retrieved on Jan. 30, 2011], Retrieved from the Internet: <URL:http://www.non-woven.co.uk/reports/polymer%20fibres%202002%20contents.html>.*

Sikkema, D., "Design, synthesis and properties of a novel rigid rod polymer, PIPD or 'M5': high modulus and tenacity fibres with substantial compressive strength" Polymer, 1998, v. 39, No. 24, pp. 5981-5986.*

Hageman, et al, "An ab initio study of the structural and physical properties of a novel rigid-rod polymer: PIPD" Polymer, 1999, 40, pp. 1313-1323.*

Arunan et al. "Definition of the hydrogen bond (IUPAC Recommendations 2011)", Pure Appl. Chem. , vol. 83. No. 8, (2011), pp. 1637-1641.*

Liu et al, "Surface modification of high performance PBO fibers using radio frequency argon plasma", Surface & Coatings Technology 206 (2012) pp. 3534-3541.*

* cited by examiner

*Primary Examiner* — Matthew Daniels
*Assistant Examiner* — Dennis Cordray

(57) ABSTRACT

The invention concerns a paper comprising (a) 40 to 70 parts by weight of polypyridobisimidazole fiber, polypyridobisimidazole pulp, or mixtures thereof and (b) 30 to 60 parts by weight of friction modifiers, structural resins, wet-strength resins, processing aids, fillers, and mixtures thereof; the parts by weight being based on the total amount of a) and b) in the paper.

20 Claims, No Drawings

FRICTION PAPERS COMPRISING PIPD FIBER

CROSS REFERENCE TO RELATED APPLICATIONS

This application is a 371 of PCT/US2006/062271, filed Dec.19, 2006, and claims benefit of U.S. application Ser. No. 60/752,854 filed Dec. 21, 2005, the disclosure of which is incorporated herein by reference.

FIELD OF THE INVENTION

The present invention concerns friction papers containing polypyridobisimidazole fiber, polypyridobisimidazole pulp, or mixtures thereof.

BACKGROUND OF THE INVENTION

Friction papers are utilized, for example, in breaking and transmission systems in the automotive industry. These papers must be durable and have high heat resistance.

One approach to providing such papers is the use of resin impregnated fibrous systems. European Patent Application No. 123,312 discloses a friction paper that includes aromatic polyamide fibers, fillers, and other materials, impregnated with a curable, thermosetting resin. European Patent Application No. 1,203,847 discloses a fiber base impregnated with a resin with friction modifying particles on the surface. U.S. Pat. No. 6,139,688 discloses aramid fiber coated with chitosan is useful in manufacture of friction paper.

There is a need for friction papers with improved properties.

SUMMARY OF THE INVENTION

In some embodiments, the invention concerns paper comprising (a) 40 to 70 parts by weight of polypyridobisimidazole fiber, polypyridobisimidazole pulp, or mixtures thereof; and (b) 30 to 60 parts by weight of friction modifiers, structural resins, wet-strength resins, processing aids, fillers, and mixtures thereof, where the parts by weight being based on the total amount of solids in a) and b) contained in the paper.

Some papers have 50 to 65 parts by weight polypyridobisimidazole fiber. In some papers, the polypyridobisimidazole fiber is PIPD.

Suitable friction modifiers include silica, celite, or carbon.

In certain embodiments, the structural resin is phenolic, modified phenolic, polyimide, or epoxy resin or mixtures thereof.

Some papers have a wet-strength resin that is a melamine formaldehyde resin.

Suitable processing aids include aluminum sulfate, aluminum chlorohydrate, calcium chloride, mineral acid, ammonium hydroxide, fines retention aids, silane, or soda ash.

In some embodiments. The paper further includes a binder. One preferred binder is latex. In some embodiments, a latex dispersion is used.

In some aspects, the invention concerns friction papers comprising (a) 40 to 70 parts by weight of a mixture of (i) polypyridobisimidazole fiber, polypyridobisimidazole pulp, or mixtures thereof and (ii) fiber selected from the group of para-aramid fiber, acrylic fiber, cellulose fiber, graphite fiber, glass fiber, metal fiber, ceramic fiber, vitreous fiber, and mixtures thereof; and (b) 30 to 60 parts by weight of a material selected from the group of friction modifiers, structural resins, wet-strength resins, processing aids, fillers, and mixtures thereof; where the parts by weight being based on the total amount of solids in a) and b) contained in the paper.

In some embodiments, the paper has 50 to 65 parts by weight polypyridobisimidazole fiber In some embodiments, the polypyridobisimidazole fiber is PIPD.

In some embodiments, papers of the invention are used in an automatic transmission.

DETAILED DESCRIPTION OF ILLUSTRATIVE EMBODIMENTS

In some embodiments, the invention concerns paper comprising (a) 40 to 70 parts by weight of polypyridobisimidazole fiber, polypyridobisimidazole pulp, or mixtures thereof; (b) 30 to 60 parts by weight of friction modifiers, structural resins, wet-strength resins, processing aids, fillers, and mixtures thereof, where the parts by weight are based on the total amount of a) and b) in the paper.

In some embodiments, the invention concerns a friction paper comprising (a) 40 to 70 parts by weight of a mixture of (i) polypyridobisimidazole fiber, polypyridobisimidazole pulp, or mixtures thereof and (ii) fiber selected from the group of para-aramid fiber, acrylic fiber, cellulose fiber, graphite fiber, glass fiber, metal fiber, ceramic fiber, vitreous fiber, and mixtures thereof; and (b) 30 to 60 parts by weight of a material selected from the group of friction modifiers, structural resins, wet-strength resins, processing aids, fillers, and mixtures thereof; where the parts by weight are based on the total amount of a) and b) in the paper.

For the purpose of this invention, "Papers" are flat sheets producible on a paper machine, such as a Fourdrinier or inclined-wire machine. In preferred embodiments these sheets are generally thin, fibrous sheets comprised of a network of randomly oriented, short fibers laid down from a water suspension and bonded together by their own chemical attraction, friction, entanglement, binder, or a combination thereof. The paper can have basis weight from about 10 to about 700 g/m2 and a thickness from about 0.015 to about 2 mm.

Friction papers are durable, heat and stress resistant, and often porous paper used in wet transmission and breaking systems that provide stable friction performance under a variety of conditions. A friction paper must have some elasticity and the performance of the paper must be unaffected by compression set and abrasion; it must also be able to dissipate heat effectively The instant invention utilizes polypyridobisimidazole fiber. This fiber is made from a rigid rod polymer that is of high strength. The polypyridobisimidazole polymer of this fiber has an inherent viscosity of at least 20 dl/g or at least 25 dl/g or at least 28 dl/g. Such fibers include PIPD fiber (also known as M5® fiber and fiber made from poly[2,6-diimidazo[4,5-b:4,5-e]-pyridinylene-1,4(2,5-dihydroxy)phenylene). PIPD fiber is based on the structure:

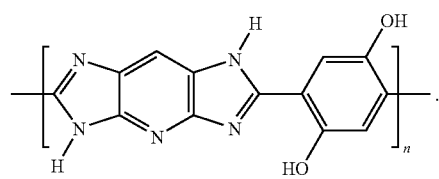

Polypyridobisimidazole fiber can be distinguished from the well known commercially available PBI fiber or polybenzimidazole fiber in that that polybenzimidazole fiber is a polybibenzimidazole. Polybibenzimidazole fiber is not a rigid rod polymer and has low fiber strength and low tensile modulus when compared to polypyridobisimidazoles.

PIPD fibers have been reported to have the potential to have an average modulus of about 310 GPa (2100 grams/denier) and an average tenacity of up to about 5.8 Gpa (39.6 grams/denier). These fibers have been described by Brew, et al., *Composites Science and Technology* 1999, 59, 1109; Van der Jagt and Beukers, *Polymer* 1999, 40, 1035; Sikkema, *Polymer* 1998, 39, 5981; Klop and Lammers, *Polymer,* 1998, 39, 5987; Hageman, et al., *Polymer* 1999, 40, 1313.

One method of making rigid rod polypyridobisimidazole polymer is disclosed in detail in U.S. Pat. No. 5,674,969 to Sikkema et al. Polypyridobisimidazole polymer may be made by reacting a mix of dry ingredients with a polyphosphoric acid (PPA) solution. The dry ingredients may comprise pyridobisimidazole-forming monomers and metal powders. The polypyridobisimidazole polymer used to make the rigid rod fibers used in the fabrics of this invention should have at least 25 and preferably at least 100 repetitive units.

For the purposes of this invention, the relative molecular weights of the polypyridobisimidazole polymers are suitably characterized by diluting the polymer products with a suitable solvent, such as methane sulfonic acid, to a polymer concentration of 0.05 g/dl, and measuring one or more dilute solution viscosity values at 30° C. Molecular weight development of polypyridobisimidazole polymers of the present invention is suitably monitored by, and correlated to, one or more dilute solution viscosity measurements. Accordingly, dilute solution measurements of the relative viscosity ("$V_{rel}$" or "$\eta_{rel}$" or "$n_{rel}$") and inherent viscosity ("$V_{inh}$" or "$\eta_{inh}$" or "$n_{inh}$") are typically used for monitoring polymer molecular weight. The relative and inherent viscosities of dilute polymer solutions are related according to the expression $$V_{inh} = \ln(V_{rel})/C,$$

where ln is the natural logarithm function and C is the concentration of the polymer solution. $V_{rel}$ is a unitless ratio of the polymer solution viscosity to that of the solvent free of polymer, thus $V_{inh}$ is expressed in units of inverse concentration, typically as deciliters per gram ("dl/g"). Accordingly, in certain aspects of the present invention the polypyridobisimidazole polymers are produced that are characterized as providing a polymer solution having an inherent viscosity of at least about 20 dl/g at 30° C. at a polymer concentration of 0.05 g/dl in methane sulfonic acid. Because the higher molecular weight polymers that result from the invention disclosed herein give rise to viscous polymer solutions, a concentration of about 0.05 g/dl polymer in methane sulfonic acid is useful for measuring inherent viscosities in a reasonable amount of time.

Exemplary pyridobisimidazole-forming monomers useful in this invention include 2,3,5,6-tetraaminopyridine and a variety of acids, including terephthalic acid, bis-(4-benzoic acid), oxy-bis-(4-benzoic acid), 2,5-dihydroxyterephthalic acid, isophthalic acid, 2,5-pyridodicarboxylic acid, 2,6-napthalenedicarboxylic acid, 2,6-quinolinedicarboxylic acid, or any combination thereof. Preferably, the pyridobisimidazole forming monomers include 2,3,5,6-tetraaminopyridine and 2,5-dihydroxyterephthalic acid. In certain embodiments, it is preferred that that the pyridobisimidazole-forming monomers are phosphorylated. Preferably, phosphorylated pyridobisimidazole-forming monomers are polymerized in the presence of polyphosphoric acid and a metal catalyst.

Metal powders can be employed to help build the molecular weight of the final polymer. The metal powders typically include iron powder, tin powder, vanadium powder, chromium powder, and any combination thereof.

The pyridobisimidazole-forming monomers and metal powders are mixed and then the mixture is reacted with polyphosphoric acid to form a polypyridobisimidazole polymer solution. Additional polyphosphoric acid can be added to the polymer solution if desired. The polymer solution is typically extruded or spun through a die or spinneret to prepare or spin the filament.

PIPD pulp has a high affinity for water, meaning the pulp has a high moisture content. This is believed to help eliminate static effects that cause clumping and defects normally associated with other high performance pulps that do not absorb water to the same degree and are afflicted with static problems. In addition, both PIPD pulp and PIPD floc have the surprising attribute of self-bonding; that is, papers formed solely from the pulp or solely from the floc have a surprisingly higher strength than would be anticipated by the prior art papers made from high performance fibers. While not wanting to be bound by theory, it is believed that this higher strength is due to hydrogen bonding between the surfaces of the pieces of pulp and floc.

PIPD pulp can be made from conventional pulp making process well known to those skilled in the art. See, for example, Handbook for Pulp & Paper Technologists, 3rd Edition, Gary A. Smook, 2002; Kocurek, M. J.; Technical Association of the Pulp and Paper Industry; Canadian Pulp and Paper Association; and U.S. Pat. No. 5,171,402 and U.S. Pat. No. 5,084,136 to Haines et al.

Friction papers can be made by combining the desired ingredients in a slurry and making paper by conventional technologies. Such processes are well known to those skilled in the art.

Paper from PIPD pulp, for example, by a process comprising of the following steps: (a) preparing an aqueous dispersion of PIPD pulp; (b) diluting the aqueous dispersion in a paper making mold cavity; (c) draining the water from the aqueous dispersion to yield a wet paper; (d) dewatering and drying the resultant paper; and (e) conditioning the paper for physical property testing.

In some embodiments, one or more additional fibers may be used. These fibers include para-aramid fiber, acrylic fiber, cellulose fiber, graphite fiber, glass fiber, metal fiber, ceramic fiber, vitreous fiber, and mixtures thereof Friction modifiers are well known to those skilled in the art. Suitable friction modifiers include silica, celite, or carbon.

Numerous structural resins are known to those skilled in the art. In certain embodiments, the structural resin is phenolic, modified phenolic, polyimide, or epoxy resin or mixtures thereof. Modified phenolic resins include epoxy, cashew, alkyl, tung oil, and silicone modified phenolic resin.

Some papers have a wet-strength resin that is a melamine formaldehyde resin or a polyamide-epichlorohydrin (PAE) resin.

Suitable processing aids include aluminum sulfate, aluminum chlorohydrate, calcium chloride, mineral acid, ammonium hydroxide, fines retention aids, silane, or soda ash. Other processing aids can be used in the instant inventions so long as they do not interfere with the intended end use.

In some embodiments. The paper further includes a binder. One preferred binder is a latex suspension.

Test Methods

The following test methods were used in the following Examples.

Canadian Standard Freeness (CSF) is a well-known papermakers' measure of the facility for water to drain through a calibrated screen from a slurry or dispersion of pulp and fibers. Freeness is measured by TAPPI test T227. The test mimics what happens as a fiber/particle/water slurry forms paper on the moving screen of a paper machine. Data obtained from the test are expressed as Canadian Standard Freeness Numbers, which are the milliliters of water that drain from an aqueous slurry under specified conditions. A large number, i.e., a high freeness, indicates that water drains rapidly through the fiber pad accumulating on the screen. A low number indicates that the fiber slurry drains slowly. Water without fiber gives a CSF of 880 ml, while numbers below 100 ml are questionable, because many short fibers may be passing through the screen. The Schopper-Riegler freeness test is more conclusive for CSF values below 100 ml. The freeness is inversely related to the degree of fibrillation of the pulp, since greater numbers of fibrils reduce the rate at which water drains through a forming paper mat.

EXAMPLES

This invention will now be illustrated by the following specific examples. All parts and percentages are by weight unless otherwise indicated. Examples prepared according to the process or processes of the current invention are indicated by numerical values.

Example 1

This example illustrates how the pulp of this invention can be incorporated into an automatic transmission paper application. A slurry containing desirable amounts of the pulp of this invention, clay, latex, friction modifiers such as silica and carbon, and diatomaceous earth is used to form a paper on a paper machine. From the paper, a ring is stamped and the object is soaked in a solution of a binder resin such as phenolic resin. Upon heating to remove residual solvent and to cure the resin, the ring is adhered to a metal plate used in an automatic transmission.

Example 2

This example illustrates the production of a PIPD based friction paper on a paper machine. A slurry consisting of 60% of PIPD fibers, 35% of friction modifiers and fillers comprising equal parts of carbon, celite, silica, and diatomaceous earth, and 5% latex is formed into a paper on a paper machine. Upon removal of water, the paper is impregnated with 35% (based on total dry paper weight) phenolic resin. Heating of the paper will cure the resin.

Example 3

This example illustrates how a fiber based pre-cursor friction paper (no impregnation) can be obtained in the laboratory. The amount of PIPD pulp of this invention that corresponds to 0.80 grams of dry weight is agitated in 3 liters of water in a pulp disintegrator set to 16500 revolutions. Then, 40% of filler and friction modifiers are added and agitated with the pulp slurry from above for another 16500 revolutions. 4% latex is added with stirring by hand. Alum is then used to lower the pH of the furnish to 5-6. Water is then added to bring the slurry to a total volume of 8 liters. The slurry is then poured onto a 21×21 cm hand sheet mold. The formed paper is then treated with a hand sheet roll, is dried at 120° C. and is impregnated with phenolic resin.

What is claimed:
1. A paper comprising:
  (a) 40 to 70 parts by weight of self bonding polypyridobisimidazole fiber, self bonding polypyridobisimidazole pulp, or mixtures thereof and wherein the self bonding is bonding between surfaces of pieces of the fiber and the pulp;
  (b) 30 to 60 parts by weight of friction modifiers, structural resins, wet-strength resins, processing aids, fillers, and mixtures thereof;
  the parts by weight being based on the total amount of solids in a) and b) contained in the paper.
2. The paper of claim 1 comprising 50 to 65 parts by weight polypyridobisimidazole fiber.
3. The paper of claim 1 wherein the polypyridobisimidazole fiber is PIPD.
4. The paper of claim 1 wherein the friction modifier is silica, celite, diatomaceous earth, or carbon.
5. The paper of claim 1 wherein the structural resin is phenolic, modified phenolic, polyimide, or epoxy resin or mixtures thereof.
6. The paper of claim 1 wherein the wet-strength resin is melamine formaldehyde.
7. The paper of claim 1 wherein the processing aid is aluminum sulfate, aluminum chlorohydrate, calcium chloride, mineral acid, ammonium hydroxide, fines retention aids, silane, or soda ash.
8. The paper of claim 1 further including a binder.
9. The paper of claim 8 wherein the binder is latex.
10. An automatic transmission comprising the paper of claim 1.
11. A friction paper comprising:
  a) 40 to 70 parts by weight of a mixture of
    i) self bonding polypyridobisimidazole fiber, self bonding polypyridobisimidazole pulp, or mixtures thereof and wherein the self bonding is bonding between surfaces of pieces of the fiber and the pulp and
    ii) fiber selected from the group of para-aramid fiber, acrylic fiber, cellulose fiber, graphite fiber, glass fiber, metal fiber, ceramic fiber, vitreous fiber, and mixtures thereof; and
  b) 30 to 60 parts by weight of a material selected from the group of friction modifiers, structural resins, wet-strength resins, processing aids, fillers, and mixtures thereof; the parts by weight being based on the total amount of solids in a) and b) contained in the paper.
12. The paper of claim 11 having 50 to 65 parts by weight polypyridobisimidazole fiber.
13. The paper of claim 11 wherein the polypyridobisimidazole fiber is PIPD.
14. The paper of claim 11 wherein the friction modifier is silica, celite, or carbon.
15. The paper of claim 11 wherein the structural resin is phenolic, modified phenolic, polyimide, or epoxy resin or mixtures thereof.
16. The paper of claim 11 wherein the wet-strength resin is melamine formaldehyde.
17. The paper of claim 1 wherein the processing aid is aluminum sulfate, aluminum chlorohydrate, calcium chloride, mineral acid, ammonium hydroxide, retention aids, silane, or soda ash.
18. The paper of claim 11 further including a binder.
19. The paper of claim 18 wherein the binder is a latex suspension.
20. An automatic transmission comprising the paper of claim 11.

* * * * *